United States Patent
Nakao et al.

(10) Patent No.: US 7,095,773 B2
(45) Date of Patent: Aug. 22, 2006

(54) INJECTION LOCKING TYPE OR MOPA TYPE OF LASER DEVICE

(75) Inventors: Kiyoharu Nakao, Isehara (JP); Yoshifumi Ueno, Tsukuba (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 10/094,889

(22) Filed: Mar. 12, 2002

(65) Prior Publication Data

US 2002/0141470 A1 Oct. 3, 2002

(30) Foreign Application Priority Data

Mar. 21, 2001 (JP) ........................................ 2001-081569
Sep. 4, 2001 (JP) ........................................ 2001-267158

(51) Int. Cl.
*H01S 3/223* (2006.01)

(52) U.S. Cl. ............................................ 372/55; 372/58

(58) Field of Classification Search .................. 372/55, 372/32, 102, 56, 57, 58, 59, 29.011
See application file for complete search history.

(56) References Cited

U.S. PATENT DOCUMENTS

| | | | | | |
|---|---|---|---|---|---|
| 4,697,257 | A | * | 9/1987 | Sugiyama | .................... 369/43 |
| 4,987,491 | A | * | 1/1991 | Kaite et al. | ................. 348/497 |
| 5,375,147 | A | * | 12/1994 | Awata et al. | ................. 375/371 |
| 5,666,385 | A | * | 9/1997 | Sullivan et al. | ............. 375/296 |
| 5,766,137 | A | * | 6/1998 | Omata | ........................ 600/587 |
| 6,005,880 | A | | 12/1999 | Basting et al. | |
| 6,016,325 | A | * | 1/2000 | Ness et al. | ................ 372/38.07 |
| 6,327,286 | B1 | * | 12/2001 | Ness et al. | ................ 372/38.02 |
| 6,359,922 | B1 | * | 3/2002 | Partlo et al. | ................... 372/58 |
| 6,370,174 | B1 | * | 4/2002 | Onkels et al. | ............ 372/38.04 |
| 6,381,256 | B1 | | 4/2002 | Stamm et al. | |
| 6,381,257 | B1 | * | 4/2002 | Ershov et al. | ................. 372/57 |
| 6,400,741 | B1 | * | 6/2002 | Matsunaga et al. | ...... 372/38.02 |
| 6,442,182 | B1 | | 8/2002 | Govorkov et al. | |
| 6,490,306 | B1 | | 12/2002 | Stamm et al. | |
| 6,567,450 | B1 | * | 5/2003 | Myers et al. | .................. 372/55 |
| 6,625,191 | B1 | * | 9/2003 | Knowles et al. | .............. 372/55 |
| 2002/0015430 | A1 | | 2/2002 | Osmanow et al. | |
| 2002/0154668 | A1 | * | 10/2002 | Knowles et al. | .............. 372/55 |
| 2002/0154671 | A1 | * | 10/2002 | Knowles et al. | .............. 372/57 |

FOREIGN PATENT DOCUMENTS

| | | | |
|---|---|---|---|
| JP | 63-092073 | | 4/1988 |
| JP | 01-241189 | | 9/1989 |
| JP | 01-276785 | | 11/1989 |
| JP | 02-101788 | | 4/1990 |
| JP | 11-177168 | | 7/1999 |
| JP | 2000-156535 | * | 6/2000 |
| JP | 2000-223408 | | 8/2000 |

* cited by examiner

*Primary Examiner*—Minsun C H Harvey
*Assistant Examiner*—Tuan N. Nguyen
(74) *Attorney, Agent, or Firm*—Rader, Fishman & Grauer PLLC

(57) ABSTRACT

An injection locking type or MOPA type of laser device capable of always providing stable output energy and wavelength is provided. For this purpose, the laser device includes an oscillator for exciting laser gas by oscillator discharge and oscillating seed laser light with band-narrowed wavelength, an amplifier for amplifying the seed laser light by amplification discharge to emit amplified laser light, a delay circuit for setting at least one of a delay time from light emission of the seed laser light to light emission of the amplified laser light, and a delay time from start of the oscillator discharge to start of the aforementioned amplification discharge, and a delay time compensation circuit for performing compensation of the delay circuit so that the delay time becomes an optimal delay time.

8 Claims, 11 Drawing Sheets

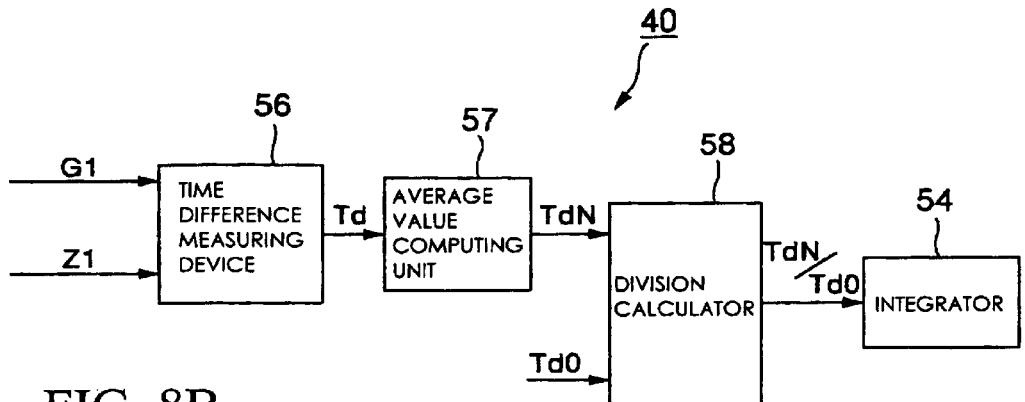
FIG. 8B
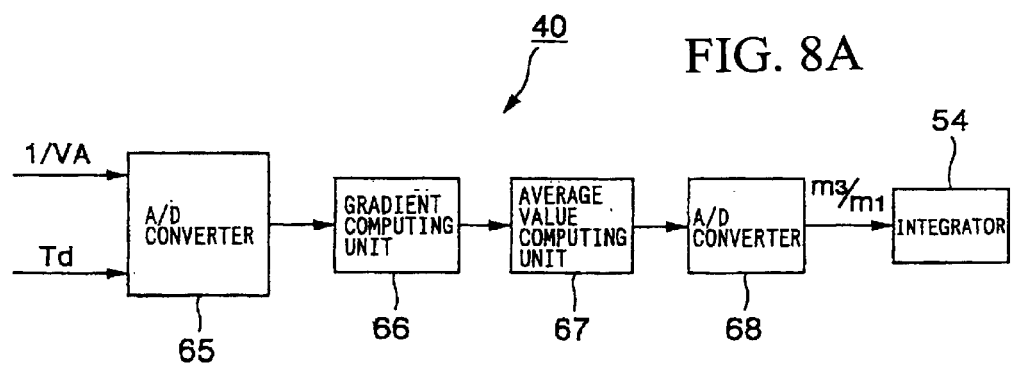
FIG. 8A
FIG. 9
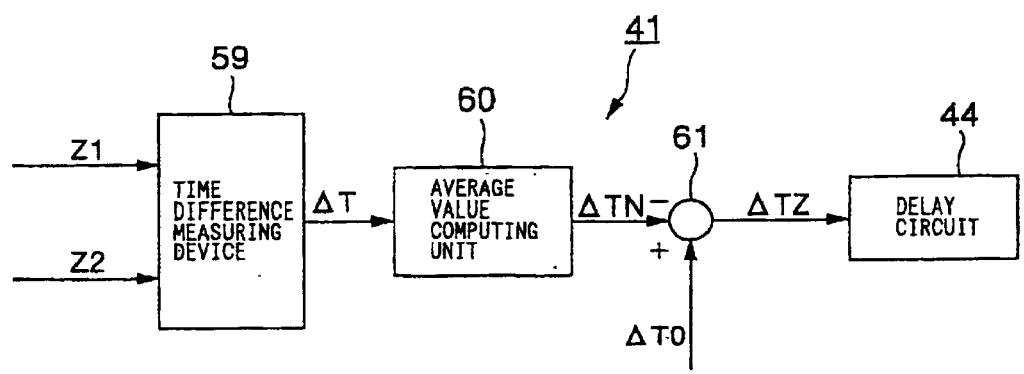

INJECTION LOCKING TYPE OR MOPA TYPE OF LASER DEVICE

The present application claims priority based on Japanese Patent Application No. 2001-267158, filed Sep. 4, 2001, the entirety of which being incorporated herein by reference.

The present application also claims priority based on Japanese Patent Application No. 2001-081569, filed Mar. 21, 2001, the entirety of which being incorporated herein by reference.

TECHNICAL FIELD

The present invention relates to an injection locking type or MOPA (Main Oscillator Power Amplifier) type of laser device, or a gas laser device, and more particularly, to an art of synchronizing an oscillator and an amplifier in the injection locking type or MOPA type of laser device.

BACKGROUND ART

Conventionally, in an injection locking type of laser device in which seed laser light oscillated from an oscillator is amplified in an amplifier, an art of synchronizing light emission of seed laser light and light emission of amplified laser light in the amplifier is disclosed in, for example, Japanese Patent Laid-open No. 2000-156535. According to Japanese Patent Laid-open No. 2000-156535, the seed laser light emitted from a titanium sapphire laser device is amplified by amplification discharge inside an amplifier chamber, and is emitted as amplified laser light. The art disclosed in the aforementioned Laid-open Patent uses a harmonic component of the band-narrowed titanium sapphire laser device as an oscillator. However, the harmonic component of the titanium sapphire laser device produces very low output energy, and in order to obtain seed laser light having sufficient output energy, which can be amplified in the amplifier, the titanium sapphire laser device becomes large in size and expensive.

When an excimer laser device is used as a lithography light source, a center wavelength of amplified laser light sometimes has to be changed according to ambient air pressure and the like. This needs changing a center wavelength of the seed laser light, but it is difficult when the oscillator is a titanium sapphire laser device. Further, when a fluorine molecular laser device is constituted to be of an injection locking type, the center wavelength thereof is shorter than an ArF excimer laser device (157 nm), and therefore it is difficult to find a laser device suitable as an oscillator. Consequently, as a light source for lithography, an injection locking type of laser device with a discharge excitation type of excimer laser device or fluorine molecular laser device, which is the same as the amplifier, being used as an oscillator is used.

FIG. 18 shows a constitution of an injection locking type of fluorine molecular laser device using the discharge excitation type of fluorine molecular laser device as an oscillator, according to a prior art. In FIG. 18, an oscillator 11A includes an oscillator chamber 12A in which a laser gas containing fluorine and neon (Ne) is sealed. A pair of oscillator electrodes 14A and 15A are placed at a predetermined position of the oscillator chamber 12A to oppose each other. The oscillator 11A includes an oscillator charger 42A to output oscillator voltage VA. It also includes an oscillator discharge circuit 43A for pulse-compressing the oscillator voltage VA and transferring it between the oscillator electrodes 14A and 15A to cause pulse discharge.

An amplifier 11B includes an amplifier chamber 12B in which a pair of amplifier electrodes 14B and 15B are placed to oppose each other and a laser gas is sealed. Further, it includes an amplifier charger 42B to output amplifier voltage VB, and an amplification discharge circuit 43B for pulse-compressing the amplifier voltage VB and transferring it between the amplifier electrodes 14B and 15B to cause pulse discharge. The oscillator voltage VA and the amplifier voltage VB are collectively called charge voltages VA and VB.

When a trigger signal G is outputted to a laser controller from an aligner 25 such as a stepper, discharge is caused between the oscillator electrodes 14A and 15A to excite laser gas, and seed laser light 21A in a pulse form occurs. The seed laser light 21A is oscillated with bandwidth of wavelength being narrowed by a band-narrowing unit 30. The amplifier 11B outputs a trigger signal G3 by delaying the trigger signal G by a predetermined delay time to be taken by a delay circuit 44 to cause amplification discharge between the amplifier electrodes 14B and 15B. As a result, the seed laser light 21A is amplified with a center wavelength $\lambda c$ and a spectral bandwidth $\Delta\lambda$ (hereinafter, they are called wavelength characteristics) being kept while traveling between unstable resonators 36 and 37 to be amplified laser light 21B and is emitted.

However, the aforementioned prior art has the disadvantages described below. Specifically, the oscillator discharge circuit 43A and the amplification discharge circuit 43B have LC resonator circuits for pulse compression, and magnetic cores contained in the LC resonator circuits each have the characteristic that a voltage-time product is fixed. Consequently, in each of the oscillator 11A and the amplifier 11B, time from the input of the trigger signal G to the occurrence of discharge between the electrodes 14 and 15 varies for each pulse oscillation due to variations in high voltages VA and VB. A short-term time variation as described above is called jitter.

Specifically, the time from the trigger signal G to the light emission of the seed laser light 21A in the oscillator 11A and the time from the trigger signal G to the amplifier 11B causing amplification discharge are varied independently. As a result, the time from the trigger signal G to the emission of the amplified laser light 21B is varied in a short-term, which sometimes causes a problem to working. Further, a timing of light emission of the seed laser light 21A and a timing of amplification discharge are not matched with each other, and the seed laser light 21A is not suitably amplified, whereby the disadvantage that the output energy, the center wavelength $\lambda c$, the spectral bandwidth $\Delta\lambda$ or the like of the amplified laser light 21B is varied.

SUMMARY OF THE INVENTION

The present invention is made in view of the above-described disadvantages, and its object is to provide an injection locking type or MOPA type of laser device and a gas laser device, which can always obtain stable output energy and wavelength.

In order to attain the above-described object, a first aspect of an injection locking type or MOPA type of laser device has a constitution including an oscillator for exciting a laser gas by oscillator discharge and oscillating seed laser light with band-narrowed wavelength, an amplifier for amplifying the seed laser light by amplification discharge to emit amplified laser light, a delay circuit for setting at least one of a delay time from light emission of the seed laser light to light emission of the amplified laser light and a delay time from start of the oscillator discharge to start of the amplification discharge, and a delay time compensation circuit for performing compensation of the delay circuit so that the delay time becomes an optimal delay time.

According to the above constitution, delay time is compensated so that amplification discharge is carried out in an optimal timing for the seed laser light, and therefore the wavelength and output energy of the amplified laser light are optimized.

Further, in the laser device,
a constitution, which includes discharge detectors having coils, and detecting current passing through the coils due to electromagnetic waves occurring from the oscillator discharge and the amplification discharge to thereby detect starts of the oscillator discharge and the amplification discharge, may be suitable.

According to the above constitution, light emission of the seed laser light is detected based on the oscillator discharge, and therefore delay time can be accurately detected even when, for example, light emission of the seed laser light is weak and is not detected. By compensating this based on the delay time accurately detected, the amplified laser light can be suitably oscillated.

Further, in the laser device,
the delay circuit and the delay time compensation circuit may have a constitution in which they measure at least one of a time difference from the light emission of the seed laser light to the light emission of the amplified laser light and a time difference from the start of the oscillator discharge to the start of the amplification discharge, and match the delay time with the optimal delay time based on the measured time difference.

According to the above constitution, a control of accurate delay time is possible based on the actually measured time difference.

A second aspect of the injection locking type or MOPA type of laser device according to the present invention has a constitution including
an oscillator for exciting a laser gas by oscillator discharge and oscillating seed laser light with band-narrowed wavelength,
an amplifier for amplifying the seed laser light by amplification discharge to emit amplified laser light, a delay circuit for setting at least one of a delay time from light emission of the seed laser light to light emission of the amplified laser light and a delay time from start of the oscillator discharge to start of the amplification discharge, and jitter compensation circuits each provided at the oscillator and the amplifier, and each compensating jitter of total elapsed time from a trigger signal being a reference to start of each discharge based on charge voltage applied to each of discharge circuits of the oscillator and the amplifier.

According to the above constitution, jitter of the discharge circuits is compensated, and therefore the total elapsed times from the trigger signal being a reference, to the light emission of the seed laser light and to light emission of the amplified laser light become constant in a short term, and it is easy to synchronize the light emission of the seed laser light and amplified laser light.

Further, in the laser device, the constitution in which the compensation of the jitter based on the charge voltage is performed based on an inverse of the charge voltage may be suitable. According to the constitution, the inverse of the discharge voltage is substantially proportional to the total elapsed time of the discharge circuit, and therefore compensation can be performed based on the linear correlation, thus facilitating compensation.

Further, in the laser device, a constitution including drift compensation circuits for compensating the jitter compensation circuits based on respective characteristics of the discharge circuits, may be suitable. According to the above constitution, even if the characteristics of the discharge circuits are changed due to, for example, temperature change and the like, it is possible to compensate jitter accurately by the drift compensation circuits. Accordingly, the total elapsed time is not changed in a short term, and it becomes easy to synchronize the light emission of the seed laser light and the light emission of the amplified laser light.

A third aspect of the injection locking type or MOPA type of laser device according to the present invention has the constitution including
an oscillator for exciting a laser gas by oscillator discharge and oscillating seed laser light with band-narrowed wavelength,
an amplifier for amplifying the seed laser light by amplification discharge to emit amplified laser light, a laser monitor for detecting at least one of output energy, center wavelength and spectral bandwidth of the seed laser light and the amplified laser light, and a laser controller for determining whether the seed laser light and the amplification discharge are synchronized with each other or not based on detection values of the laser monitor.

According to the above constitution, whether they are synchronized or not can be accurately determined. Accordingly, when the timing of, for example, the seed laser light and the timing of the amplified laser light do not match and they are not synchronized, an abnormal signal is outputted to the aligner, whereby working is not performed with abnormal laser light and proper working is always possible. When the timings do not match, it is suitable if compensation is performed again so that they are synchronized, whereby the timings can be matched.

A fourth aspect of the injection locking type or MOPA type of laser device according to the present invention has the constitution including
an oscillator for exciting a laser gas by oscillator discharge and oscillating seed laser light with band-narrowed wavelength,
an amplifier for amplifying the seed laser light by amplification discharge to emit amplified laser light, a discharge circuit provided at the oscillator, and a jitter compensation circuit provided at the oscillator, and performing a control to compensate jitter of total elapsed time from a trigger signal being a reference to start of discharge based on charge voltage applied to the discharge circuit and a control to make the total elapsed time constant.

According to the above constitution, the time from the trigger signal to the start of discharge is always made constant, and therefore the seed laser light is always emitted in the same timing, thus facilitating the control when it is used for working and the like.

A gas laser device according to the present invention has a constitution including
a jitter compensation circuit for performing a control to compensate jitter of total elapsed time from a trigger signal being a reference to start of discharge, based on the discharge voltage applied to the discharge circuit and a control to make the total elapsed time constant.

In the above gas laser device, the amplified laser light is always emitted in the same timing, and therefore the control is easy when it is used for working and the like.

BRIEF DESCRIPTION OF THE DRAWINGS

FIG. 8A and FIG. 8B are block diagrams of a drift compensation circuit according to the first embodiment;

FIG. 9 is a block diagram of a delay time compensation circuit according to the first embodiment;

BEST MODE FOR CARRYING OUT THE INVENTION

Preferred embodiments according to the present invention will be explained in detail below with reference to the drawings.

Figure 1:
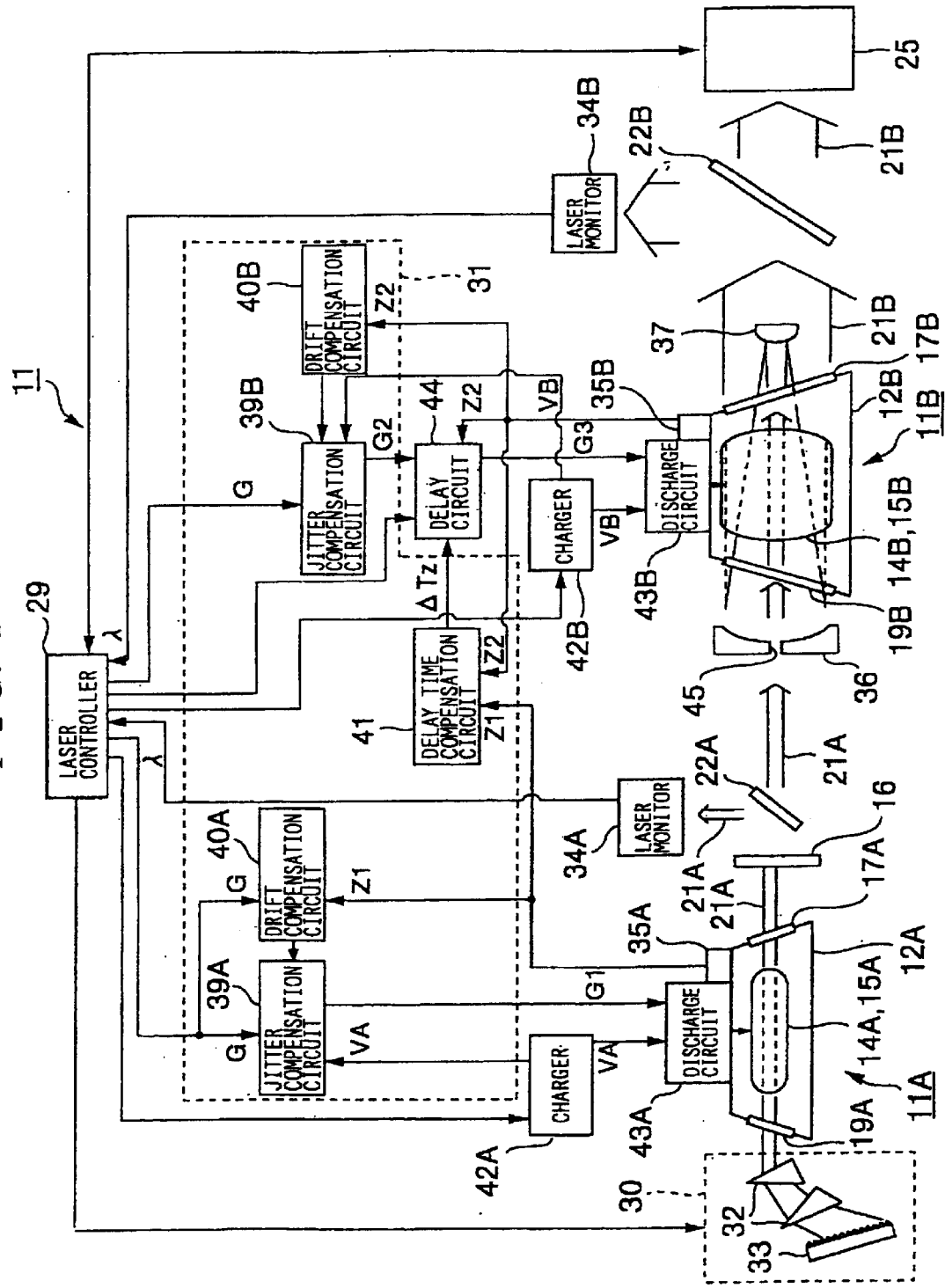
FIG. 1 is a schematic block diagram of a fluorine molecular laser device according to a first embodiment of the present invention.

Initially, a first embodiment will be explained. FIG. 1 shows a block diagram of an injection locking type of fluorine molecular laser device 11 (hereinafter, called the fluorine molecular laser device 11) according to the first embodiment. In FIG. 1, the fluorine molecular laser device 11 includes an oscillator 11A for oscillating seed laser light 21A with band-narrowed wavelength, an amplifier 11B for emitting amplified laser light 21B for amplifying the seed laser light 21A. The amplified laser light 21B emitted from the fluorine molecular laser device 11 is incident on an aligner 25 such as a stepper to be a light for working.

The fluorine molecular laser device 11 includes a laser controller 29 for controlling the entire device. The laser controller 29 is electrically connected to the aligner 25 and they are communicable with each other. The laser controller 29 receives a trigger signal G, which is the signal indicating laser oscillation, from the aligner 25, and following this, it outputs the trigger signal G to the oscillator 11A and the amplifier 11B. In this situation, the timing for the trigger signal G is compensated by a compensation circuit 31 that will be described later, and is outputted to the oscillator 11A as a trigger signal G1. The trigger signal G is outputted to the amplifier 11B as a trigger signal G3, with a predetermined time delay as compared with that to the oscillator 11A by the compensation circuit 31 and a delay circuit 44.

The oscillator 11A includes an oscillator chamber 12A in which a laser gas containing, for example, fluorine ($F_2$) and neon (Ne) is sealed, and windows 17A and 19A provided at both end portions of the oscillator chamber 12A. As a laser gas, fluorine, neon and helium (He) may be suitable, and fluorine and helium may also be suitable.

A pair of oscillator electrodes 14A and 15A are placed to oppose each other in a direction perpendicular to the paper surface of FIG. 1 at a predetermined position inside the oscillator chamber 12A. When an oscillator discharge circuit 43A receives the trigger signal G1, oscillator voltage VA applied from an oscillator charger 42A is pulse-compressed by the oscillator discharge circuit 43A, and is applied between the oscillator electrodes 14A and 15A in a pulse form. As a result, oscillator discharge occurs between the oscillator electrodes 14A and 15A, whereby the laser gas is excited and the seed laser light 21A in a pulse form occurs.

The occurring seed laser light 21A is incident on a band-narrowing unit 30 placed at a rear portion (the left side of the paper surface of FIG. 1) of the oscillator chamber 12A, then is expanded by prisms 32 and 32, and is incident on a grating 33. In the grating 33, only the seed laser light 21A having wavelength in the vicinity of predetermined center wavelength $\lambda c$ is reflected by diffraction. This is called band narrowing. In the grating 33, an angle to the seed laser light 21A is made variable by a drive mechanism (not shown) electrically connected to the laser controller 29. The laser controller 29 outputs a signal to the drive mechanism to change the above-described angle, whereby it is possible to control the center wavelength $\lambda c$ of the seed laser light 21A to be desired wavelength.

The seed laser light 21A, which is band-narrowed inside the band narrowing unit 30, is emitted forward (rightward on the paper surface of FIG. 1) as the seed laser light 21A having the center wavelength $\lambda c$. Part of the seed laser light 21A is taken out by a beam splitter 22A and is incident on a laser monitor 34A. The laser monitor 34A monitors output energy, center wavelength $\lambda c$ and spectral bandwidth $\Delta \lambda$ (hereinafter, they are called parameters), and outputs them to the laser controller 29.

Based on the monitored center wavelength $\lambda c$, the laser controller 29 outputs a command signal to the aforementioned drive mechanism to rotate the grating 33, and thereby controls the center wavelength $\lambda c$ of the seed laser light 21A to be a desired target wavelength $\lambda 0$. This is called a wavelength control. The laser controller 29 also outputs a command signal to the oscillator charger 42A based on the monitored pulse output to change the oscillator voltage VA, and thereby controls the pulse output of the seed laser light 21A to be desired output. This is called a constant energy control. The constant energy control is also carried out for the amplifier in the same manner so that pulse output of the amplified laser light 21B becomes desired output.

The seed laser light 21A emitted from the oscillator 11A is incident on the amplifier 11B. The amplifier 11B includes an amplifier chamber 12B in which a front window 17B and a rear window 19B are fixed at a front and rear portion thereof and fluorine gas and neon gas are sealed. In the amplifier chamber 12B, a pair of amplifier electrodes 14B and 15B are placed to oppose each other in the perpendicular direction to the paper surface of FIG. 1. A concave mirror 36 with a hole having an injection hole 45 is provided behind the rear window 19B, and a convex mirror 37 is provided in front of the front window 17B to oppose the injection hole 45, whereby an unstable resonator is constituted.

In FIG. 1, the seed laser light 21A oscillated from the oscillator 11A passes through the rear window 19 from the injection hole 45 of the concave mirror 36 with a hole, and is incident on the amplifier 11B. An amplifier charger 42B applies amplifier voltage VB to an amplification discharge circuit 43B. The amplifier voltage VB is pulse-compressed in the amplification discharge circuit 43B based on the trigger signal G3 compensated by the compensation circuit 31 and the delay circuit 44, and is applied between the amplifier electrodes 14B and 15B in a pulse form. As a result, amplification discharge occurs synchronously with the seed laser light 21A, and the seed laser light 21A is amplified while being reflected to and from the concave mirror 36 with a hole and the convex mirror 37. As a result, the seed laser light 21A has pulse output amplified while keeping the wavelength characteristics, and is emitted through the convex mirror 37 as the amplified laser light 21B.

Figure 2:
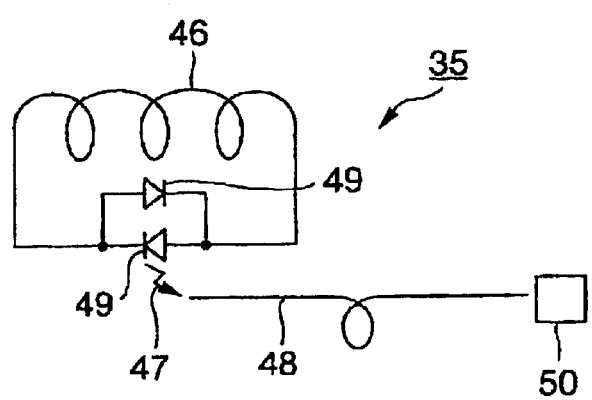
FIG. 2 is a circuit diagram of a discharge detector according to the first embodiment.

The oscillator 11A and the amplifier 11B include an oscillator discharge detector 35A and an amplification discharge detector 35B for detecting that oscillator discharge and amplification discharge are carried out. The discharge detectors 35A and 35B include a coil 46 and a light emitting diode 49 for connecting both poles thereof, as shown in, for example, FIG. 2. When discharge occurs, electromagnetic induction occurs to the coil 46 due to electromagnetic waves occurring from the discharge, and the light emitting diode 49 emits. Emission 47 of the light emitting diode 49 is guided to a light detector 50 by an optical fiber 48, and discharge is detected by an electric signal outputted from the light detector 50. Since the light emitting diode 49 is used, the electromagnetic wave of the discharge is electrically shut off, and the discharge detector 35 seldom operates in a wrong way, which makes it possible to surely detect discharge.

As described above, the fluorine molecular laser device 11 includes the compensation circuit 31 for synchronizing the seed laser light 21A emitted from the oscillator 11A and the amplified laser light 21B, with the trigger signal G as reference. The compensation circuit 31 includes jitter compensation circuits 39A and 39B for controlling an elapsed time from the trigger signal G to the start of discharge from varying in a short term according to the variation in the oscillator voltage VA.

Further, in preparation for the characteristics of the discharge circuits 43A and 43B varying according to a long-term temperature change and the like, the compensation circuit 31 includes drift compensation circuits 40A and 40B for matching compensation coefficients of the jitter compensation circuits 39A and 39B with this change in the characteristics. The jitter compensation circuits 39A and 39B are included in the oscillator 11A and the amplifier 11B, respectively, and the drift compensation circuits 40A and 40B are the same. Further, the compensation circuit 31 includes a delay time compensation circuit 41 for matching a delay time ΔT, which is from the light emission of the seed laser light 21A to the light emission of the amplified laser light 21B, or from the start of the oscillator discharge to the start of the amplification discharge, to a predetermined optimal delay time ΔT0.

Figure 3:
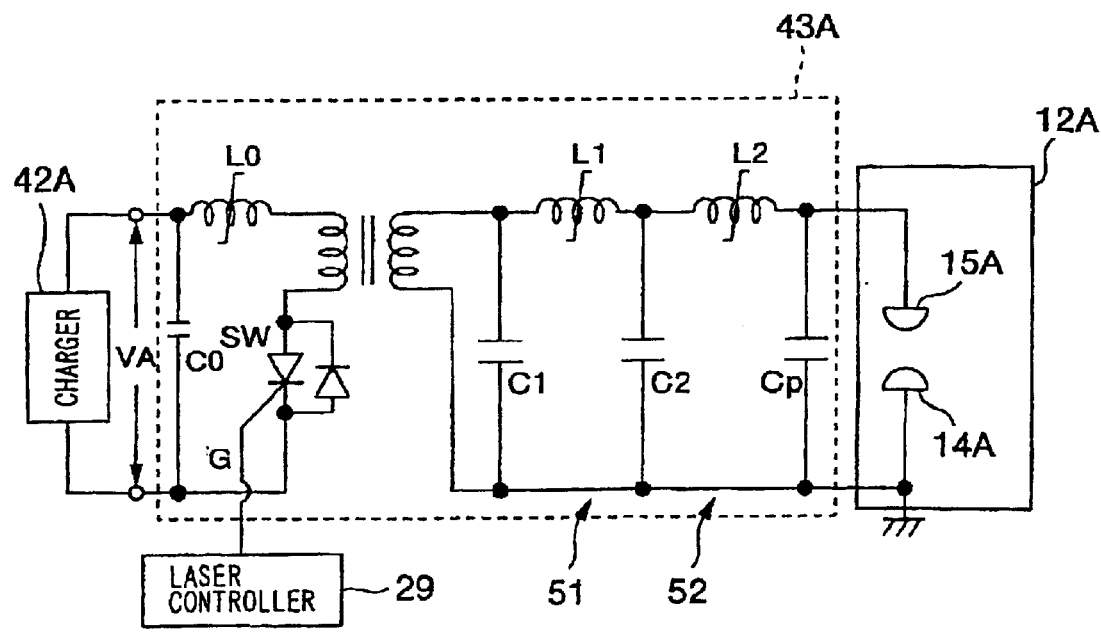
FIG. 3 is a circuit diagram of a discharge circuit according to the first embodiment.

FIG. 3 shows an example of a circuit constitution of the oscillator discharge circuit 43A in a block diagram. The circuit constitution is substantially the same in the amplification discharge circuit 43B. In FIG. 3, the oscillator discharge circuit 43A includes a charge capacitor C0, a switching device SW, an assist coil L0, a first saturable reactor L1, a first capacitor C1, a second saturable reactor L2 and a peaking capacitor Cp. The first saturable reactor L1 and the first capacitor C1 constitute a first LC resonator circuit 51 and the second saturable reactor L2 and the peaking capacitor Cp constitute a second LC resonator circuit 52. Each of the assist coil L0, and the first and second saturable reactors L1 and L2 are saturated when a product of voltage applied to both ends thereof and voltage applying time (this is called a voltage-time product) becomes a predetermined value, and rapidly has low impedance.

The oscillator charger 42A applies the oscillator voltage VA based on the command signal from the laser controller 29 between both poles of the charger capacitor C0. When the trigger signal G is inputted to the switching device SW from the aligner 25 via the laser controller 29, the switching device SW is switched on. Following this, a current flows from the charge capacitor C0 to the second LC resonator circuit 52 through the assist coil L0 for protecting the switching device SW and the first LC resonator circuit 51. In this situation, inductance of the second LC resonator circuit 52 is set to be smaller than inductance of the first LC resonator circuit 51, and compression of current pulse is carried out. When voltage between both poles of the peaking capacitor Cp reaches a predetermined value, oscillator discharge occurs between the oscillator electrodes 14A and 15A, and a laser medium is excited to oscillate the seed laser light 21A in a pulse form.

A total elapsed time Tt from the trigger signal G to the start of discharge includes a discharge circuit elapsed time Td from switching on the switching device SW to start of discharge and a gate elapsed time Te which is taken for the trigger signal G to pass through various kinds of gate circuits (not shown). The gate elapsed time Te is always substantially constant from characteristics of electric circuits. On the other hand, as explained in the paragraph of the disadvantages to be eliminated by the invention, a variation called jitter occurs in the discharge circuit elapsed time Td in the discharge circuit 43.

The jitter occurs because the voltage-time product of each of the saturable reactors L1 and L2 in the assist coil L0 and the first and the second LC resonator circuits 51 and 52 is constant. Specifically, time (applying time of the aforesaid voltage) taken to make the assist coil L0 and each of the saturable reactors L1 and L2 low impedance varies as a result that the oscillator voltage VA varies. In this situation, jitter of the oscillator discharge circuit 43A is a sum total of jitter occurring in the assist coil L0, the first saturable reactor L1 and the second saturable reactor L2.

Consequently, in order to restrain the jitter and make the total elapsed time Tt from the trigger signal G to the start of discharge constant, it is suitable to add jitter compensation time Tc to the discharge circuit elapsed time Td to cancel out variations in the oscillator voltage VA. A change in the oscillator voltage VA occurs due to the following two causes. They are i) it is necessary to change the oscillator voltage VA in order to make pulse output of the laser light 21A constant by the aforementioned constant energy control, and ii) it is difficult to generate the oscillator voltage VA in accordance with the command signal due to the characteristics of the charger 42.

The details of the jitter compensation circuits 39A and 39B will be explained below. The explanation is made about the jitter compensation circuit 39A of the oscillator 11A side, and the explanation regarding the jitter compensation circuit 39B at the amplifier 11B side is substantially the same.

Figure 4:
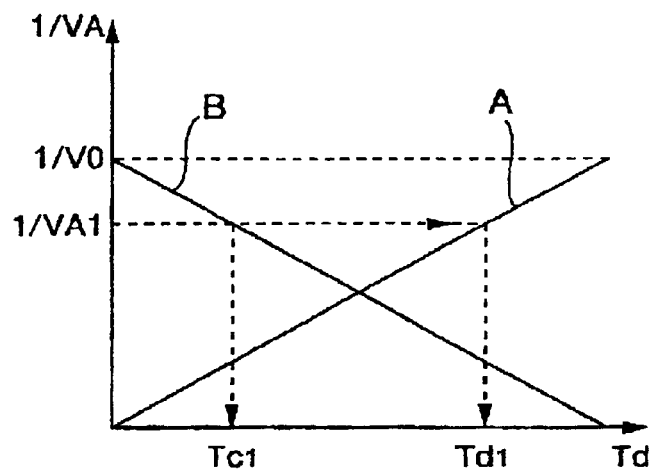
FIG. 4 is a graph showing relationship between an inverse of charge voltage and discharge circuit elapsed time, according to the first embodiment.

With the discharge circuit elapsed time Td entering a horizontal axis and an inverse 1/VA of the oscillator voltage VA entering the vertical axis, relationship between both of them is shown by the graph in FIG. 4. Since the voltage-time product is constant, the discharge circuit elapsed time Td is proportional to the inverse 1/VA of the oscillator voltage VA as shown by the line A. Accordingly, in order to make the total elapsed time Tt constant, it is proper to add the jitter compensation time Tc inversely proportional to the inverse 1/VA to the discharge circuit elapsed time Td. Specifically, as shown in FIG. 4, a compensation characteristic with an inverse gradient shown by the line B is obtained with respect to the line A showing the relationship between the inverse 1/VA and the discharge circuit elapsed time Td. In this situation, in the line B, a time Tc1 corresponding to the oscillator voltage VA=VA1 is the jitter compensation time Tc. By adding the jitter compensation time Tc to the discharge circuit elapsed time Td, the total elapsed time Tt is always constant.

Figure 5:
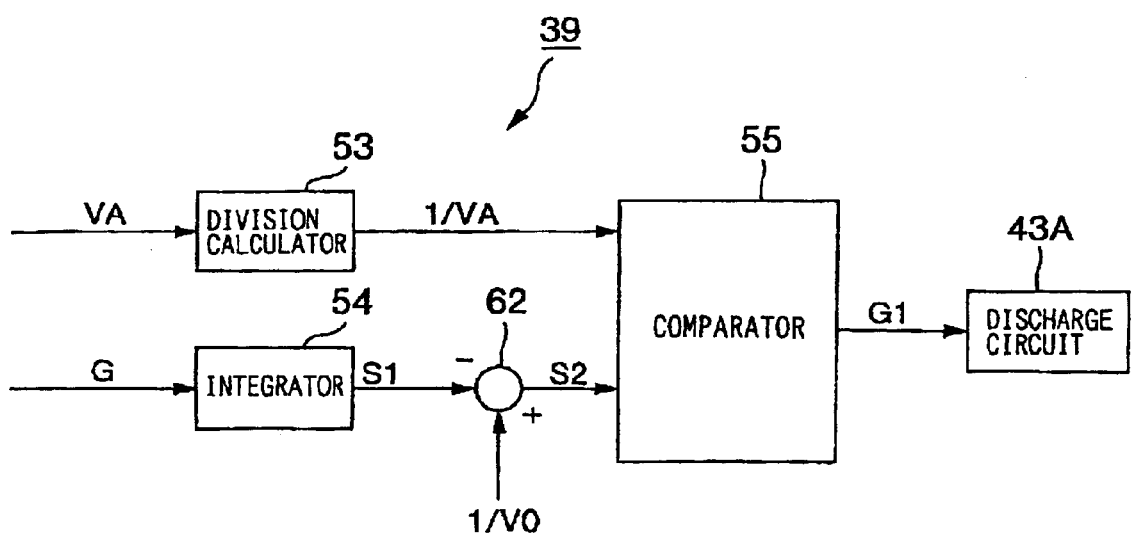
FIG. 5 is a block diagram of a jitter compensation circuit according to the first embodiment.

In FIG. 5, an example of a circuit constitution of the jitter compensation circuit 39A is shown by a block diagram. In FIG. 5, the jitter compensation circuit 39A includes a division calculator 53, an integrator (ramp wave generator) 54, an adder-subtracter 62, and comparator 55.

Figure 6:
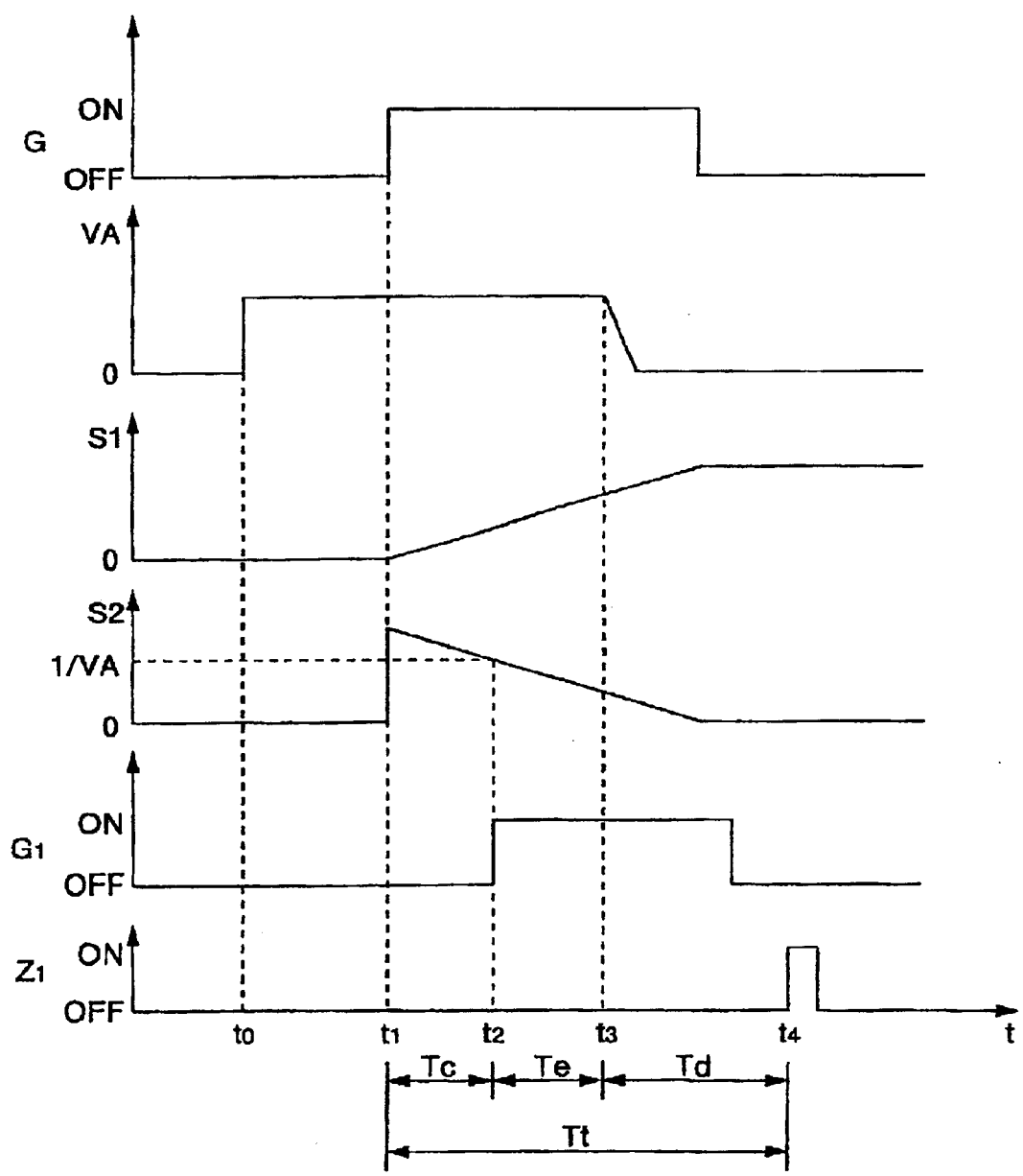
FIG. 6 is a timing chart in the jitter compensation circuit of FIG. 5.

FIG. 6 shows a timing chart in the jitter compensation circuit 39A shown in FIG. 5. Signals shown in FIG. 6 are the trigger signal G, a compensation signal S1 obtained by integrating predetermined voltage in accordance with the oscillator voltage VA and the trigger signal G with the integrator 54, a compensation signal S2 showing an inverse gradient of the compensation signal S1, which is obtained by subtracting the compensation signal S1 from an offset signal 1/Vo, a compensated trigger signal G1, and a discharge detecting signal Z1 of the oscillator discharge detected by the oscillator discharge detector 35A. The compensation signal S1 shows the characteristic of the line A in FIG. 4, and the compensation signal S2 shows the characteristic of the line B in FIG. 4, respectively.

In FIG. 6, the oscillator voltage VA applied between both poles of the charge capacitor C0 is always inputted into the division calculator 53 from a time t0, and the inverse 1/VA is obtained as output of the division calculator 53. When the trigger signal G is inputted into the integrator 54 at a time t1, a compensation signal S1 is outputted from the integrator 54, and the compensation signal S2 obtained by subtracting the compensation signal S1 from the offset signal 1/Vo is inputted the comparator 55.

The comparator 55 compares the compensation signal S2 and 1/VA, and when both of them are matched with each other at a time t2, the compensation trigger signal G1 is outputted. The time from the time t1 to the time t2 becomes the compensation time Tc inversely proportional to the inverse 1/VA. At a time t3 at which substantially constant gate elapsed time Te elapses from the time t2, the compensation trigger signal G1 is inputted into the switching device SW, and the switching device SW is switched on. As a result, the oscillator voltage VA becomes 0 volt. Subsequently, discharge occurs after a lapse of the discharge circuit elapsed time Td from the time t3, and laser oscillation occurs.

Specifically, the trigger signal G is inputted at the time t1, then the oscillator voltage VA at a later time is measured, and the compensation time Tc inversely proportional to the inverse 1/VA is obtained and is added to the discharge circuit elapsed time Td. As a result, jitter directly proportional to the inverse 1/VA of the oscillator voltage VA is cancelled, and the total elapsed time Tt from the output of the trigger signal G to the start of the oscillator discharge (=the compensation time Tc+the discharge circuit elapsed time Td+the gate elapsed time Te) becomes substantially constant for each pulse oscillation.

Next, the drift compensation circuits 40A and 40B will be explained. The drift compensation referred to here means drift compensation of jitter. The voltage-time product of the electromagnetic core used for the LC resonator is regarded as constant at atmosphere temperature in a normal range, but when the temperature is out of the normal range, it is known that the product is varied. This variation changes (drifts) the gradient of the integrator 54 of the jitter compensation circuit 39A. Since this change prevents the above-described compensation of the jitter from being satisfactorily carried out, compensation is necessary. The explanation is made as to the drift compensation circuit 40A of the oscillator 11A, but the explanation is substantially the same regarding the drift compensation circuit 40B of the amplifier 11B.

Figure 7A:
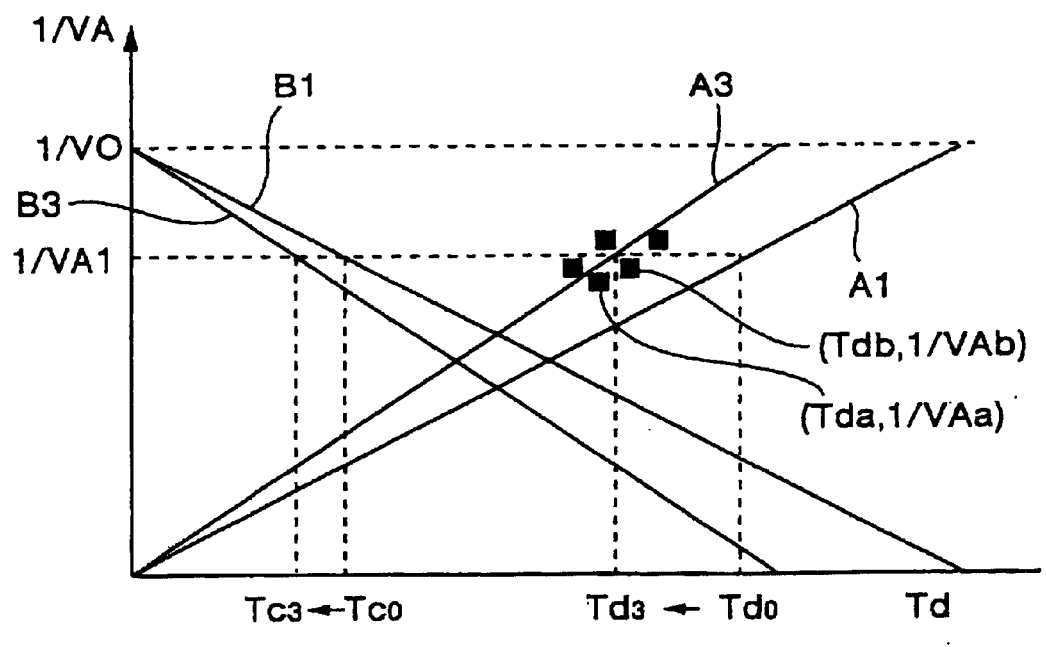
FIG. 7A and FIG. 7B are graphs showing relationship between the inverse of the charge voltage and discharge circuit elapsed time, according to the first embodiment.

In FIG. 7A, with the discharge circuit elapsed time Td entering the horizontal axis and the inverse 1/VA of the oscillator voltage VA entering the vertical axis, relationship between both of them will be shown by the graph. As shown in the data plotted with the sign "■" in FIG. 7A, the inverse 1/VA always varies. As shown in FIG. 7A, the oscillator voltage VA always varies slightly. Accordingly, the drift compensation, in which the line A2 is obtained only from the discharge circuit elapsed time Td2 actually measured, cannot cope with the drift of the discharge circuit elapsed time Td, and the compensation is not carried out satisfactorily and an error sometimes occurs.

An example of a circuit constitution of the drift compensation circuit 40 when drift compensation is strictly carried out is shown in a block diagram in FIG. 8A. In FIG. 8, the drift compensation circuit 40 includes an AD converter 65, a gradient computing unit 66, an average value computing unit 67 and a DA converter 68. The AD converter 65 reads the inverse 1/VA and the discharge circuit elapsed time Td, and carries out AD conversion thereof, each time the pulse oscillation is performed. The gradient computing unit 66 performs computation based on the following equation (1) from an inverse 1/VAb and discharge circuit elapsed time Tdb taken therein, and an inverse 1/VAa and discharge circuit elapsed time Tda taken therein one pulse before, and a gradient m of a graph of Td–1/VA is obtained.

$$m=(1/VAb-1/VAa)/(Tdb-Tda) \quad (1)$$

The average value computing unit 67 calculates an average gradient m3 in a predetermined number of pulses based on the gradient m for each pulse. As a result, a line A3, which shows relationship between the inverse 1/VA and the discharge circuit elapsed time Td more accurately than the line A2, is derived. Based on the line A3, the drift compensation circuit 40A compensates the compensation characteristic of the jitter compensation circuit 39A from the line B1 to a line B3, whereby the jitter compensation time Tc becomes Tc3 from Tc0. By adding this to the discharge circuit elapsed time Td, long-term drift is prevented. Specifically, (m3/m1), which is the result of dividing the gradient m3 obtained by the average value computing unit 67 by the gradient m1 of the line A1, is DA-converted with the DA converter 68, and this is multiplied by a gain of the integrator 54 to compensate the gain. Thus, it is possible to compensate the drift more accurately.

As described above, compensation of the drift is carried out based on the actually measured oscillator voltage VA and the discharge circuit elapsed time Td. Accordingly, even if the characteristics of the discharge circuit is changed by, for example, a temperature change and the like, it is possible to compensate jitter more accurately. Specifically, a short-time variation of the total elapsed time is small, and therefore it becomes easy to synchronize the light emission of the seed laser light 21A and the light emission of the emitting laser light 21B, or the start of the oscillator discharge and the start of the amplification discharge.

Figure 7B:
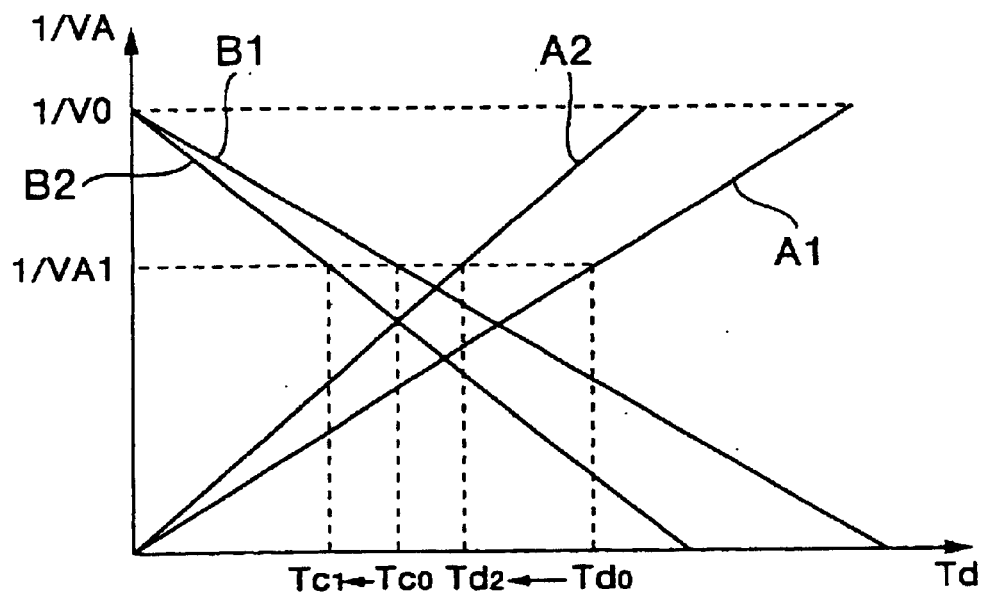

As described above, the characteristic of the discharge circuit 43A changes due to heat generation of capacitors C0, C1 and C2, where laser oscillation is continuously carried out for a long period of time, As a result, for example, as shown in FIG. 7B, inclination between the inverse number (1/VA) of the oscillator voltage VA and a discharge circuit elapsed time Td gradually shifts (In FIG. 7B, a line A1 → a line A2). This is called a drift.

If such a drift is left as it is, compensation of jitter of every pulse cannot be properly performed. In order to prevent this, the oscillator 11A and the amplifier 11B have drift compensation circuits 40A, and 40B, respectively. The drift compensation circuit 40A, and 40B prevent a long term drift by compensating characteristics of the jitter compensation circuits 39A, 39B, from a straight line B1 to straight line B2 according to change of the inclination between the reciprocal number 1/VA and the discharge circuit elapsed time Td.

Description of a concrete structure and an operation of the drift compensation circuits 40A, and 40B will be given below.

In FIG. 8B, an example of a circuit structure of the drift compensation circuit 40 is shown by a block diagram. In FIG. 8B, the drift compensation circuit has a time difference measuring device 56, an average value computing unit 57, and a division calculator 58.

The time difference measuring device 56 comprises, for example, a counter, and measures the discharge circuit elapsed time Td from input of compensation trigger G1 to output of discharge detection signal 21 after oscillation discharge occurs. The average value computing unit 57 obtains an average value TdN of the discharge circuit elapsed time Td of more than two pulses (for example, a couple thousand pulses to a couple of hundred thousand pulses). The average valve TdN of the discharge circuit elapsed time td is divided by a reference time Td0 in the division calculator 58, and then a gain of the integrator is multiplied by the (TdN/Td0) so as to compensate the gain at this time. The reference time Td0 is the discharge circuit elapsed time Td when the number of pulses is small and temperature of capacitor is low.

That is, in FIG. 7B, the inclination of the straight line A1 is (VA1/Td0), and the inclination of the straight line is (VA2/Td2). Therefore, when the inclination between the reciprocal number (1/VA) and the discharge circuit elapsed time Td is increased by (Td2/Td0), it is possible to compensate jitter well by multiplying the inclination of a compensation curved line by (Td2/Td0). The total elapsed time Tt changes for a long period of time, during that period, jitter in short term is always compensated.

The explanation regarding the jitter compensation circuit 39A and the drift compensation circuit 40A in the above is applicable to not only the oscillator 11A, but also the jitter compensation circuit 39B and the drift compensation circuit 40B provided at the amplifier 11B.

Next, the delay time compensation circuit 41 for compensating the delay circuit 44 to match the timings of the light emission of the oscillator 11A and the light emission of the amplifier 11B will be explained. In FIG. 9, a constitution example of the delay time compensation circuit 41 is shown by a block diagram. In FIG. 9, the delay time compensation circuit 41 includes a time difference measuring device 59, an average value computing unit 60 and an adder-subtracter 61.

The time difference measuring device 59 measures the delay time $\Delta T$ from the light emission of the seed laser light 21A by oscillator discharge until amplified discharge is carried out, based on the discharge detection signals Z1 and Z2 from the oscillator discharge detector 35A and the amplification discharge detector 35B. The delay time $\Delta T$ is averaged by the average value computing unit 60 to obtain an average delay time $\Delta TN$. The adder-subtracter 61 calculates a deviation amount $\Delta Tz$ of the average delay time $\Delta TN$ from the target optimal delay time $\Delta T0$, and outputs the deviation amount $\Delta Tz$ to the delay circuit 44. The delay circuit 44 further delays a compensation trigger signal G2 compensated by the jitter compensation circuit 39B so that amplification discharge is carried out in an optimal timing from the trigger signal G, and a compensation trigger signal G3 is outputted.

Figure 10:
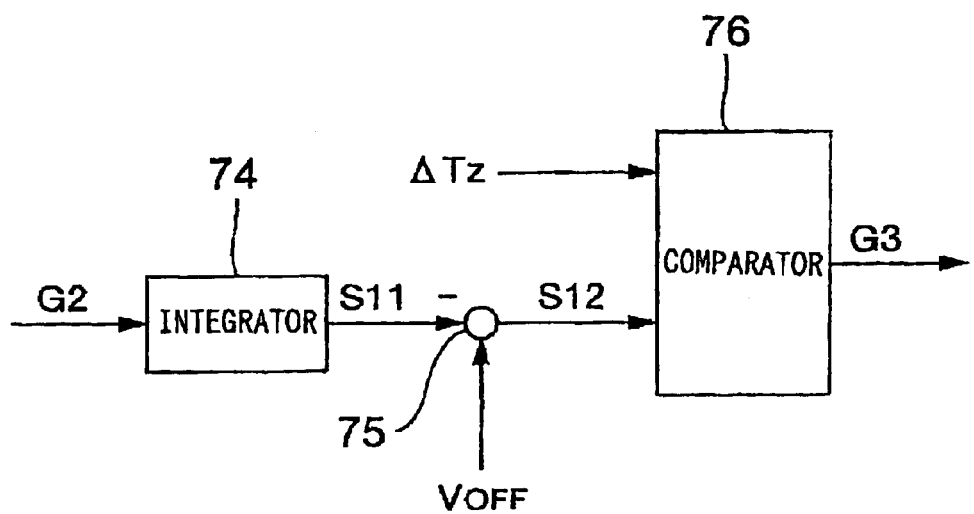
FIG. 10 is a block diagram of a delay circuit according to the first embodiment.
Figure 11:
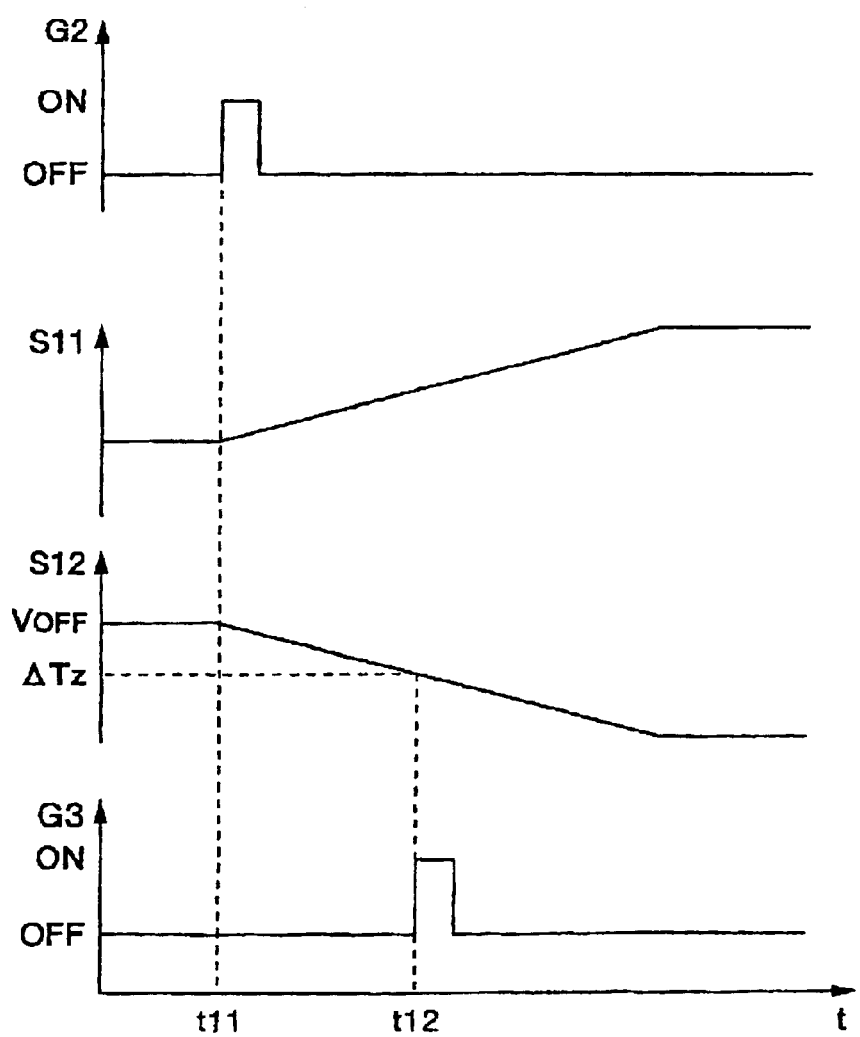
FIG. 11 is a timing chart of the delay circuit of FIG. 10.

In FIG. 10, a constitution example of the delay circuit 44 is shown by a block diagram. In FIG. 10, the delay circuit 44 includes an integrator 74, an adder-subtracter 75 and a comparator 76. The delay circuit 44 has the same function as the jitter compensation circuit 39A, and what corresponds to the inverse 1/VA of the oscillator voltage is the deviation amount $\Delta Tz$. FIG. 11 shows a timing chart in the delay circuit 44 shown in FIG. 10. The signals shown in FIG. 11 are the compensation trigger signal G2, a compensation signal S11 obtained by integrating voltage with the integrator 74 following the start of the compensation trigger signal G2, a compensation signal S12 showing an inverse gradient of the compensation signal S11, and the compensation trigger signal G3.

In FIG. 11, when the trigger signal G2 is inputted into the integrator 74 at a time t11, the integrator 74 starts integration and the compensation signal S11 is outputted. The adder-subtracter 75 subtracts the compensation signal S11 from a predetermined offset VOFF to outputs the compensation signal S12. The comparator 76 compares the compensation signal S12 and the deviation amount $\Delta Tz$, and when both of them match with each other at a time t12, it outputs the compensation trigger signal G3. As a result, the compensation trigger signal G3 is delayed based on the deviation amount $\Delta Tz$, and therefore the delay time $\Delta T$ from the light emission of the seed laser light 21A to the light emission of the amplified laser light 21B, or from the start of the oscillator discharge to the start of the amplification discharge corresponds to the optimal delay time $\Delta T0$, whereby amplification is favorably carried out.

Figure 12:
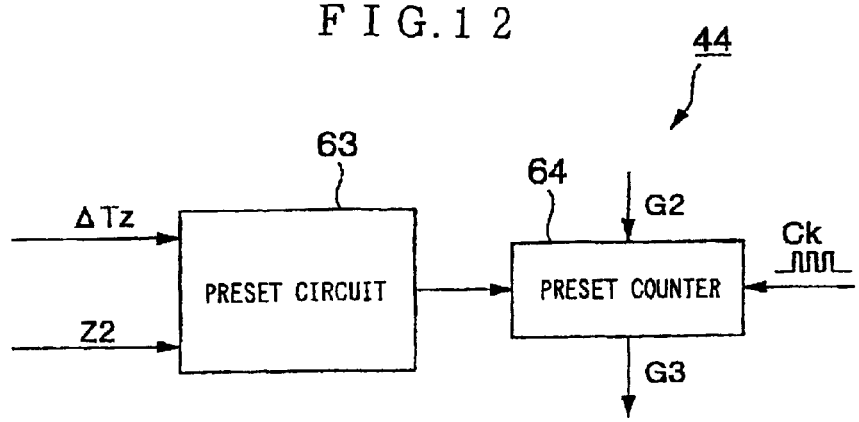
FIG. 12 is a block diagram showing another example of the delay circuit according to the first embodiment.

In FIG. 12, another example of the constitution of the delay circuit 44 is shown by a block diagram. In FIG. 12, the delay circuit 44 includes a preset circuit 63 and a preset counter 64. Each time the discharge detection signal Z2 for amplification discharge is inputted into the preset circuit 63, which is inputted a predetermined number of times, a preset value proportional to the deviation amount $\Delta Tz$ is inputted. The preset counter 64 starts counting the number of clock pulses Ck from the input of the compensation trigger signal G2, and when this corresponds to the preset value, it outputs the compensation trigger signal G3. Thus, the compensation trigger signal G3 is delayed until the deviation amount $\Delta Tz$ is eliminated, and therefore the delay time $\Delta T$ from the light emission of the seed laser light 21A to the light emission of the amplified laser light 21B, from the start of oscillator discharge to the start of amplification discharge matches with the optimal delay time $\Delta T0$, whereby amplification is favorably performed.

Next, an art of confirming whether synchronization of the light emission of the seed laser light 21A and the light emission of the amplified laser light 21B, or the start of oscillator discharge and the start of amplification discharge is carried out favorably or not will be explained.

As described above, the laser controller 29 detects at least one of the output energy, the center wavelength $\lambda c$ and the spectral bandwidth $\Delta\lambda$ of the amplified laser light 21B based on an output signal of the laser monitor 34B. In this situation, when the synchronization of the light emission of the seed laser light 21A and the light emission of the amplified laser light 21B, or the start of oscillator discharge and the start of amplification discharge is improper, it is known that output energy or a wavelength parameter of the amplified laser light 21B is out of a predetermined value. Accordingly, when the detection values of these laser parameters (output energy, the center wavelength $\lambda c$, and the spectral bandwidth $\Delta\lambda$) are deviated from predetermined allowable ranges, the laser controller 29 determines that they are not synchronized and outputs an abnormal signal to notify that they are not synchronized to the aligner 25. Thus, work is prevented from being carried out with the amplified laser light 21B with improper wavelength or output energy.

Further, the laser controller also detects at least any one of the laser parameters for the seed laser light 21A. When these laser parameters are out of predetermined allowable ranges, it also determines that they are not synchronized, and outputs to the aligner 25 an abnormal signal to notify that they are not synchronized.

The laser controller 29 laser-oscillates the oscillator 11A with the predetermined oscillator voltage VA and pulse frequency. Wave control and constant energy control are performed, and the laser parameters of the seed laser light 21A emitted from the oscillator 11A are returned within the allowable ranges. Next, the laser controller 29 makes the amplifier 11B carry out amplification discharge, then emits the amplified laser light 21B, and monitors the laser parameters. It outputs a command to the delay circuit 44 to compulsorily change the delay time, and controls the output timing of the compensation trigger signal G3 so that they are all within the allowable ranges. Thus, they are synchronized.

When the deviation from synchronization occurs, the spectral bandwidth $\Delta\lambda$ is influenced most, and therefore it is preferable that the laser controller 29 determines whether they are synchronized or not based on at least the spectral bandwidth $\Delta\lambda$.

There is the case in which the fluorine molecular laser device 11 has to stop laser oscillation for a predetermined period of time based on the command from the aligner 25. In this case, it sometimes happens that the center wavelength of the oscillator 11A is deviated during stopping due to temperature change and the like and they are not synchronized with each other. It also happens that the aforementioned drift occurs due to temperature change in the discharge circuit.

In order to prevent them, when it is stopped for a predetermined period of time or more, the fluorine molecular laser device 11 intermittently performs oscillation with a shutter (not shown) being closed so that the amplified laser light 21B is not emitted to the aligner 25. This is called adjustment oscillation, and during the adjustment oscillation, the laser controller 29 monitors the laser parameters of the oscillator 11A and the amplifier 11B, and continues a constant energy control and a wavelength control so that they are within the allowable range. During adjustment oscillation, it also performs compensation of jitter and drift. As a result, when exposure of the fluorine molecular laser device 11 is restarted, the amplified laser light 21B with the laser parameters within the allowable range is obtained, and it is possible to restart work rapidly.

As explained above, according to the first embodiment, in the injection locking type of fluorine laser device 11, the oscillator 11A and the amplifier 11B are provided with the jitter compensation circuits 39A and 39B for compensating jitter, respectively. As a result, each of the oscillator 11A and the amplifier 11B carries out discharge in a constant for the trigger signal G, and a timing in which the amplified laser light 21B is emitted becomes constant. Accordingly, the amplified laser light 21B is always incident on the aligner 25 in a constant timing, and therefore work is favorably carried out.

Further, since the light emission of the seed laser light 21A and the light emission of the amplified laser light 21B, or the start of oscillator discharge and the start of amplification discharge are always synchronized, the amplified laser light 21B with desired laser parameters can be obtained, and work can be favorably performed. Further, jitter compensation is carried out based on the oscillator voltage VA after the trigger signal G. Thus, accurate compensation can be carried out based on the newest oscillator voltage VA.

Next, a second embodiment according to the present invention will be explained. In the second embodiment, an art of fixing time required from the trigger signal G to the emission of the amplified laser light 21B will be explained.

According to the drift compensation described above, as shown in FIG. 7A, the discharge circuit elapsed time Td becomes Td3 from Td0, and the jitter compensation time Tc becomes Tc3 from Tc0, both of which become shorter. Accordingly, as it is, the total elapsed time Tt, which is the result of adding the gate elapsed time Te to a sum of the above, specifically, the time, which is from the input of the trigger signal G until the amplified laser light 21B is emitted, becomes short. When the discharge circuit elapsed time Td becomes long due to the characteristics of the discharge circuits 43A and 43B, the jitter compensation time Tc also becomes long, and the time from the input of the trigger signal G until the amplified laser light 21B is emitted becomes long.

However, if the amplified laser light require time from the output of the trigger signal G until the amplified laser light 21B is incident on the aligner 25 is not substantially constant, it is unclear when the amplified laser light 21B is incident thereon, and work cannot be favorably carried out. For this reason, in the second embodiment, compensation is carried out so that the seed laser light elapsed time, which is taken from the output of the trigger signal G to the light emission of the seed laser light 21A, becomes constant.

As described above, the delay circuit 44 performs a control so that the delay time $\Delta T$ from the light emission of the seed laser light 21A to the light emission of the amplified laser light 21B, or from the start of oscillator discharge to the start of amplification discharge becomes the optimal delay time $\Delta T0$. Accordingly, by making the seed laser light elapsed time, which is from the trigger signal G to the light emission of the seed laser light 21A, constant, the amplified laser light elapsed time from the trigger signal G to the emission of the amplified laser light 21 can be made constant.

Figure 13:
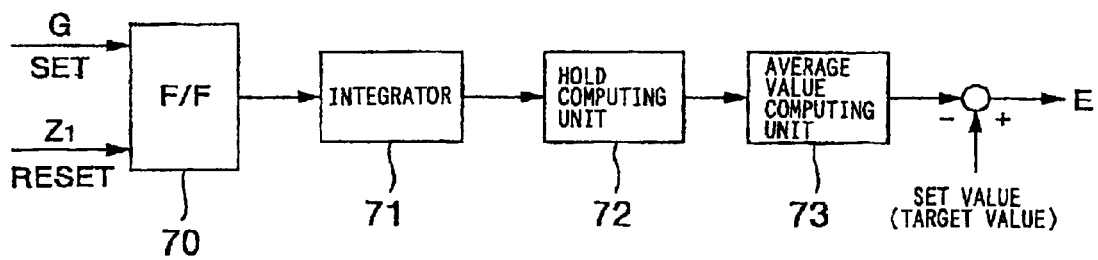
FIG. 13 is a block diagram of a seed laser light elapsed time detection circuit according to a second embodiment of the present invention.
Figure 14:
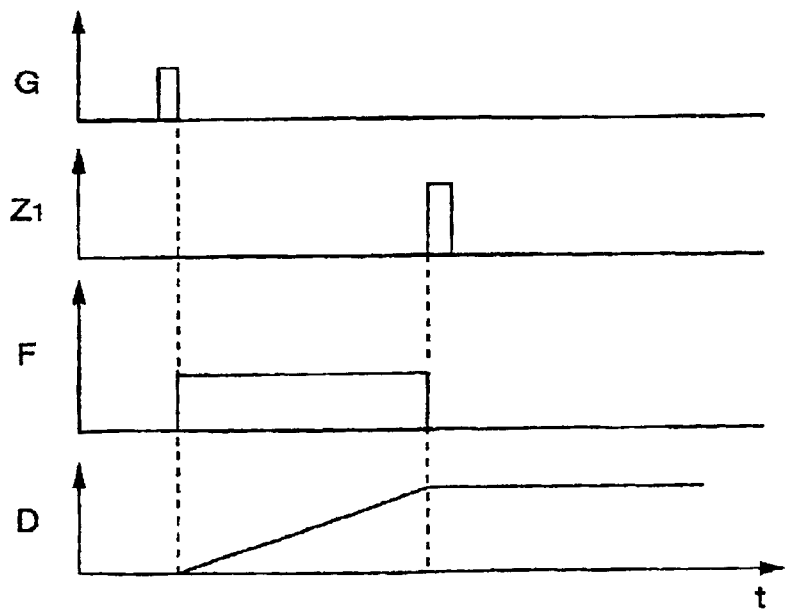
FIG. 14 is a timing chart of the seed laser light elapsed time detection circuit of FIG. 13.

In FIG. 13, an example of a constitution of a seed laser light elapsed time detection circuit for obtaining the seed laser light elapsed time, which is from the trigger signal G to the light emission of the seed laser light 21A, will be shown by a block diagram. In FIG. 13, the seed laser light elapsed time detection circuit includes a flip-flop 70, an integrator 71, a hold computing unit 72 and an average value computing unit 73. FIG. 14 shows a timing chart of the seed laser light elapsed time detection circuit shown in FIG. 13. The signals shown in FIG. 14 are the trigger signal G, an output signal F of the flip-flop 70, an output signal D of the integrator 71, and the discharge detection signal Z1 of the oscillator discharge detected with the oscillator discharge detector 35A.

As shown in FIG. 14, when the trigger signal G is inputted into the flip-flop 70, the flip-flop 70 turns ON an operation signal for the integrator 71, whereby the integrator 71 starts operation and continues to integrate a constant voltage. When the flip-flop 70 turns OFF the operation signal for the integrator 71 according to the discharge detection signal Z1, the integration is stopped. The hold computing unit 72 holds the output signal D of the integrator 71, and the average value computing unit 73 averages this. The output signal D of the integrator 71 is proportional to the time from the trigger signal G to the discharge detection signal Z1, specifically, the seed laser light elapsed time. Accordingly, a difference E between an output of the average value computing unit 73 and a target value shows an average value of the elapsed time of the seed laser light, which is oscillated until then.

Figure 15:
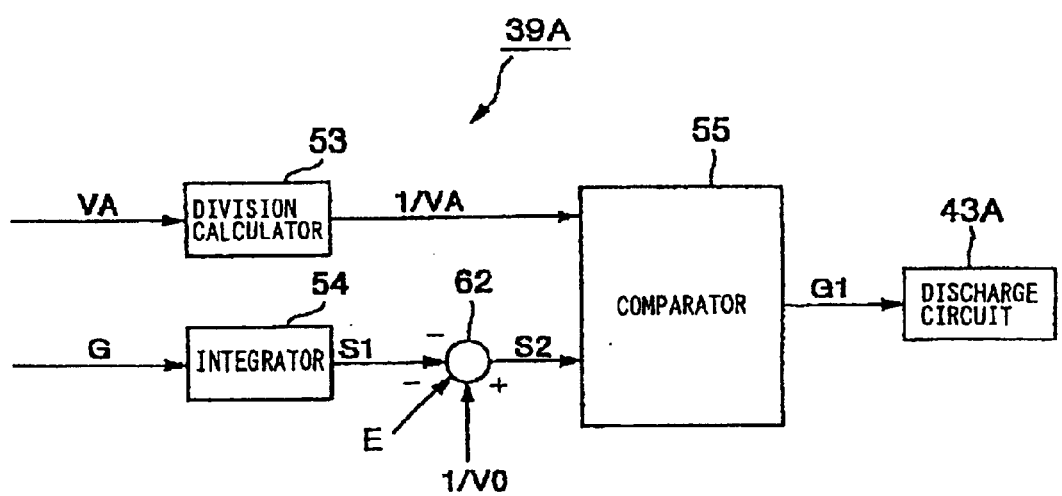
FIG. 15 is a block diagram of a jitter compensation circuit according to the second embodiment.

Next, the jitter compensation circuit 39A for compensating the seed laser light elapsed time thus obtained to be constant will be explained. In FIG. 15, an example of a circuit constitution of the jitter compensation circuit 39A according to the second embodiment will be shown by a block diagram. As shown in FIG. 15, the jitter compensation circuit 39A includes the division calculator 53, the integrator 54, the adder-subtracter 62 and the comparator 55, and the constitution is the same as what is shown in FIG. 5. According to the second embodiment, the adder-subtracter 62 in this situation not only subtracts the compensation signal S2 from the offset signal 1/Vo, but also subtracts the difference E between the output of the average value computing unit 73 shown in FIG. 13 and the target value.

Figure 16:
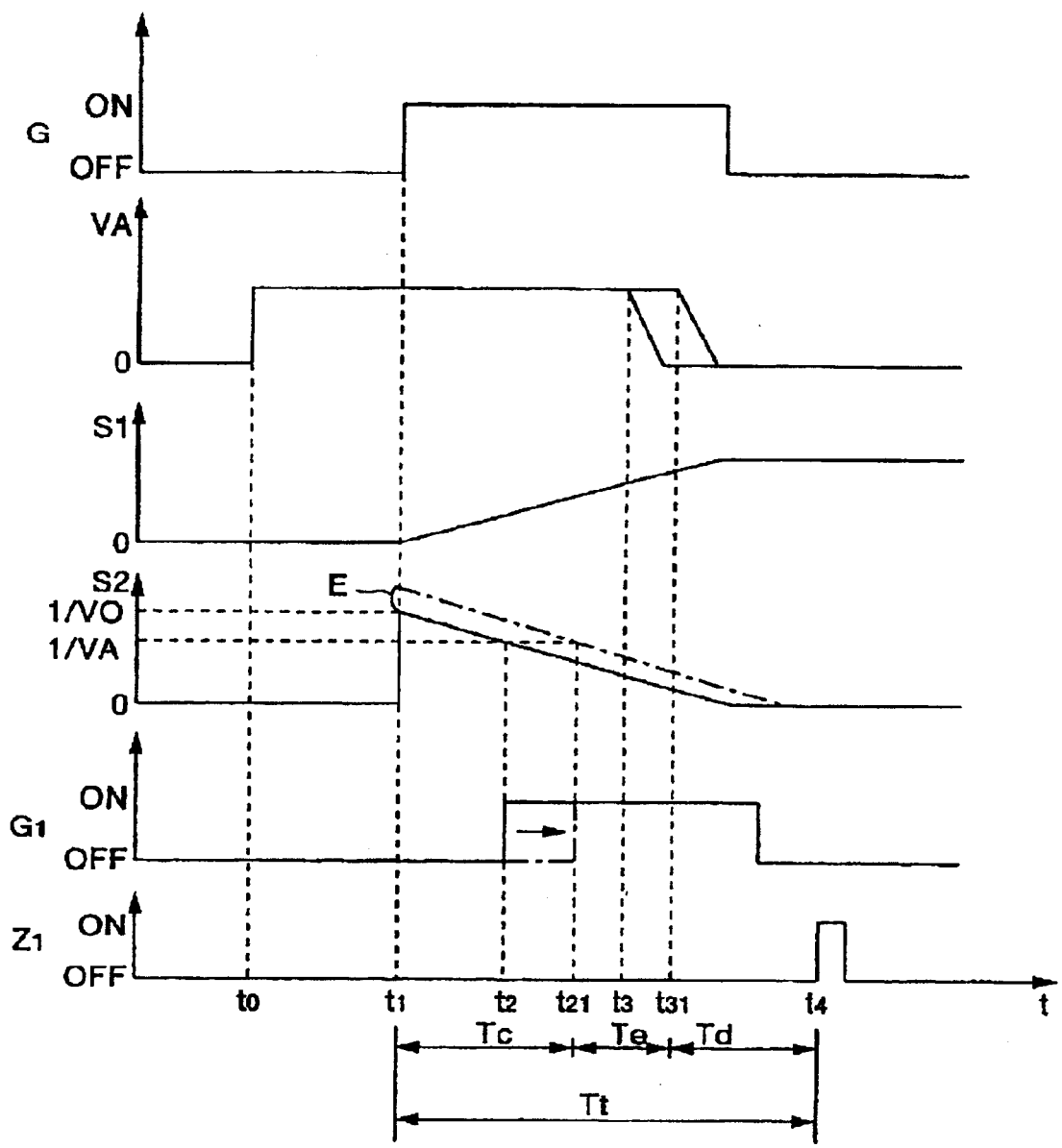
FIG. 16 is a timing chart in the jitter compensation circuit of FIG. 15.

FIG. 16 shows a timing chart in the jitter compensation circuit 39A shown in FIG. 15. The explanation of the signals is the same as in FIG. 6. As described above, as to the compensation signal S2, the difference E between the output of the average value computing unit 73 and the target value, and the compensation signal S1 are subtracted from the offset signal 1/Vo. As a result, as shown in FIG. 16, the compensation signal S2 is offset upward by an amount proportional to the seed laser light elapsed time. Accordingly, the start of the compensation trigger signal G1 is changed from the time t2 to the time t21.

At a time t31 at which the substantially constant gate elapsed time Te elapses from a time t21, the compensation trigger signal G1 is inputted into the switching device SW, and the switching device SW is brought into conduction. Thus, the oscillator voltage VA becomes 0 volt. Discharge occurs after the discharge circuit elapsed time Td elapses from the time t31, and laser oscillation occurs. Specifically, as the discharge circuit elapsed time Td is shorter, the jitter compensation time Tc is made longer, and the total elapsed time Tt is made constant.

In the second embodiment, the explanation is made about the injection locking type of fluorine molecular laser device, but this is not restrictive. Specifically, the second embodiment is an art of making time elapsed from the input of the trigger signal to the emission of laser light constant regarding the single body of the oscillator 11A. Accordingly, it is applicable not only to the injection locking type having the oscillator and the amplifier, but to a laser device of a single body that has only one laser chamber.

As a laser device of such a single body, a KrF excimer laser device, an ArF excimer laser device, or a gas laser device such as a fluorine molecular laser device can be considered. Specifically, when laser light is supplied to a working device such as the aligner 25 from the gas laser device, a reduction of working accuracy is sometimes brought about as a result that the timing for the supply of laser light is shifted. On the other hand, according to the second embodiment, the time elapsed from the input of the trigger signal to emission of the laser light is made constant, whereby laser light can be always supplied to the working device in the same timing, and reduction in working accuracy does not occur.

In each of the above embodiments, the explanation is made so that the jitter compensation circuit 39 and the drift compensation circuit 40 are constituted by hardware, but they are not limited to this, and it is possible to compensate with software by using a CPU. However, as in the explanation, by constituting the circuit with the hardware, it is possible to make compensation rapidly, and, it is also possible, for example, to compensate jitter for each pulse oscillation.

Figure 17:
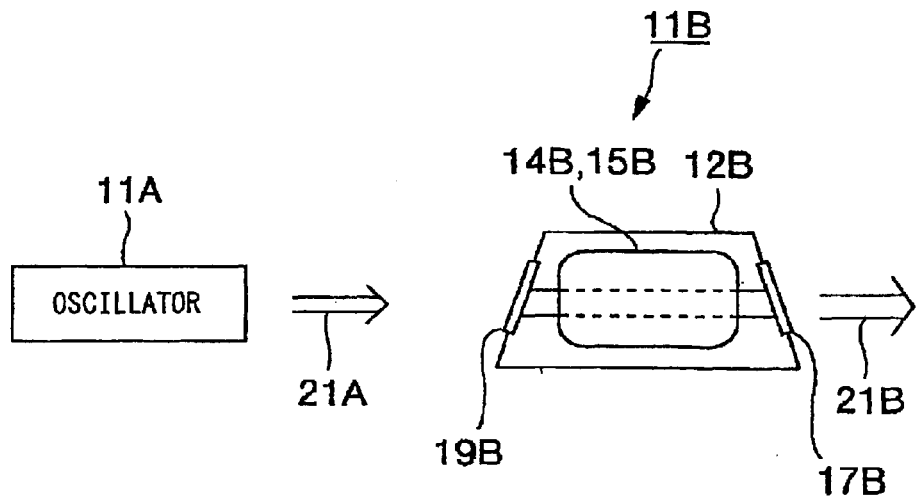
FIG. 17 is an explanatory diagram showing an application example of a constitution of a fluorine molecular laser device according to the present invention.
Figure 18:
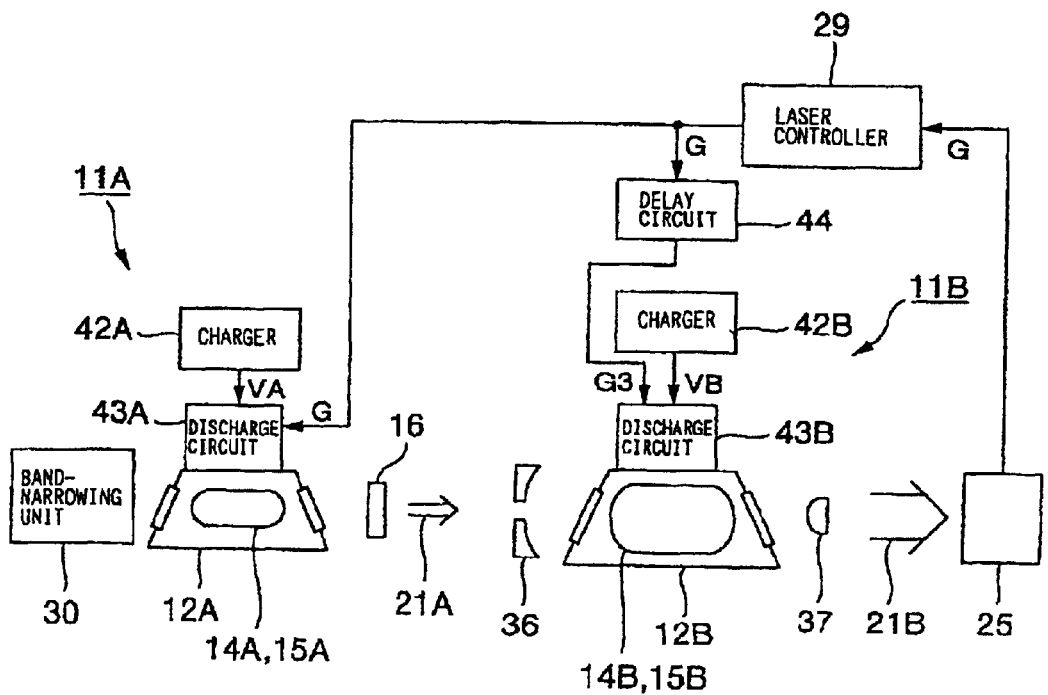
FIG. 18 is a block diagram of a fluorine molecular laser device according to a prior art.

As the explanation of the present invention, the explanation is made about the amplifier 11B in which the concave mirror 36 with a hole and the convex mirror 37 are placed in front of and behind the amplifier chamber 12B, but this is not restrictive. For example, as shown in FIG. 17, this is effective as to the MOPA type of amplifier 11B without resonators in front of and behind the amplifier chamber 12B.

The trigger signal G is explained to be sent from the aligner 25, but this is not restrictive. For example, it may be outputted from the laser controller 29, or it may be outputted from another device. Further, the present invention is not limited to the fluorine molecular laser device, but it is applicable to all the injection locking type or MOPA type of laser devices such as excimer laser devices.

What is claimed is:

1. An injection locking type or MOPA type of laser device, comprising:
    an oscillator having an amplification discharge circuit for exciting a laser gas by oscillator discharge said oscillator emitting oscillated seed laser light having a band-narrowed wavelength;
    an amplifier having a discharge circuit for amplifying said oscillated seed laser light to emit amplified laser light;
    a delay circuit for selling at least one of a plurality of delay times between parameters associated with a synchronization process of said oscillator and said amplifier;
    jitter compensation circuits provided at each of said oscillator and said amplifier, each jitter compensation circuit compensating the jitter of a total elapsed time from a reference trigger signal being a reference to a start of said oscillator discharge and amplification discharge based on a charge voltage applied to each respective discharge circuit of said oscillator and said amplifier; and
    drift compensation circuits for compensating said jitter compensation circuits of said oscillator and said amplifier based on changes in characteristics of each respective discharge circuit.

2. The injection locking type or MOPA type of laser device according to claim 1, wherein the compensation of said jitter is performed based on an inverse of said charge voltage.

3. The injection locking type or MOPA type of laser device according to claim 1, wherein compensation of the jitter is performed for each pulse oscillation.

4. The injection locking type or MOPA type of laser device according to claim 2, wherein compensation of the jitter is performed for each pulse oscillation.

5. An aligner for integrated circuit manufacturing with an injection locking type or MOPA type of laser device as a light source, the laser device comprising:
- an amplifier that amplifies seed laser light to emit amplified laser light;
- a laser monitor that receives the emitted amplified laser light and outputs a plurality of laser parameters of the emitted amplified laser light;
- an aligner that receives the amplified laser light and outputs a trigger signal; and
- a laser controller that receives the trigger signal from the aligner and receives the laser parameters from the laser monitor, the laser controller suspending exposure processing based on a command from the aligner during exposure, performing adjustment oscillation when the exposure is suspended so that the laser parameters are within a predetermined range when the exposure is resumed, and performing compensation for each of a delay time, jitter, and drift during adjustment oscillation, so that resumption of exposure is enabled, wherein when exposure is suspended the amplified laser light is prevented from emitting to the aligner.

6. An exposure method by an injection locking type or MOPA type of laser device, comprising the steps of:
- monitoring a plurality of laser parameters of emitted laser light;
- suspending exposure processing based on a command from an aligner during exposure;
- performing adjustment oscillation when the exposure is suspended, and performing compensation for each of a delay time, jitter, and drift during the adjustment oscillation, wherein when the exposure is suspended amplified laser light is prevented from emitting to the aligner; and
- enabling a resumption of exposure the laser parameters being within a predetermined range.

7. An aligner for integrated circuit manufacturing with an injection locking type or MOPA type of laser device as a light source, the laser device comprising:
- an amplifier that amplifies seed laser light to emit amplified laser light;
- an aligner that receives the amplified laser light and outputs a trigger signal; and
- a laser controller that receives the trigger signal from the aligner, the laser controller suspending exposure processing based on a command from the aligner during exposure, performing adjustment oscillation when the exposure is suspended so that the laser parameters are within a predetermined range when the exposure is resumed, and performing compensation for each of a delay time, jitter, and drift during adjustment oscillation, so that resumption of exposure is enabled, wherein when exposure is suspended the amplified laser light is prevented from emitting to the aligner.

8. An injection locking type or MOPA type of laser device comprising:
- an amplifier that amplifies seed laser light to emit amplified laser light; and
- a laser controller that receives the trigger signal from the aligner, the laser controller suspending exposure processing based on a command from the aligner during exposure, performing adjustment oscillation when the exposure is suspended so that the laser parameters are within a predetermined range when the exposure is resumed, and performing compensation for each of a delay time, jitter, and drift during adjustment oscillation so that resumption of exposure is enabled, wherein when exposure is suspended the amplified laser light is prevented from emitting to the aligner.

* * * * *